(12) United States Patent
Schroeder

(10) Patent No.: US 11,059,664 B1
(45) Date of Patent: Jul. 13, 2021

(54) COMPRESSED AIR CLEANING SYSTEM FOR PARTICLES CARRIED IN LARGE CONTAINERS

(71) Applicant: Thomas Dale Schroeder, Brooten, MN (US)

(72) Inventor: Thomas Dale Schroeder, Brooten, MN (US)

( * ) Notice: Subject to any disclaimer, the term of this patent is extended or adjusted under 35 U.S.C. 154(b) by 0 days.

(21) Appl. No.: 15/904,142

(22) Filed: Feb. 23, 2018

(51) Int. Cl.
| | |
|---|---|
| *B65D 88/70* | (2006.01) |
| *B65B 55/24* | (2006.01) |
| *B08B 9/08* | (2006.01) |
| *B08B 9/34* | (2006.01) |
| *B08B 5/02* | (2006.01) |
| *B08B 9/093* | (2006.01) |

(52) U.S. Cl.
CPC .......... *B65D 88/703* (2013.01); *B08B 9/0813* (2013.01); *B08B 9/34* (2013.01); *B65B 55/24* (2013.01); *B08B 5/02* (2013.01); *B08B 9/0933* (2013.01)

(58) Field of Classification Search
CPC ....... B65D 88/703; B08B 9/34; B08B 9/0813; B08B 9/0933; B08B 5/02; B65B 55/24
See application file for complete search history.

(56) References Cited

U.S. PATENT DOCUMENTS

| | | | | |
|---|---|---|---|---|
| 4,325,495 | A | * | 4/1982 | Mokris ................ B65D 88/703 222/1 |
| 5,594,973 | A | * | 1/1997 | Brusseleers ............. B08B 9/093 134/167 R |
| 2002/0029792 | A1 | * | 3/2002 | Carmi ................... B08B 7/0007 134/21 |
| 2016/0089701 | A1 | * | 3/2016 | Kosuda ................ B08B 15/026 15/302 |

* cited by examiner

*Primary Examiner* — David Redding
(74) *Attorney, Agent, or Firm* — Michael A. Mochinski

(57) ABSTRACT

A compressed air cleaning system for removing particles carried and transported in large containers, which includes a container having an upper portion and a lower chute portion for dispensing particles therethrough, a refillable compressed air tank adaptably connecting to an air compressor, and an air hose assembly in communication with the air tank and container.

19 Claims, 4 Drawing Sheets

COMPRESSED AIR CLEANING SYSTEM FOR PARTICLES CARRIED IN LARGE CONTAINERS

FIELD OF THE INVENTION

The present invention is generally directed to a compressed air cleaning system to effect removal of particles commonly carried and transported in large containers. More particularly, the compressed air cleaning system utilizes strategic placement of nozzles to effect systemic removal of residual, adhering particles generally present along crevices, inline surfaces and like structural features set forth within the container.

DESCRIPTION OF THE PRIOR ART

Commodities in form of foodstuff such as grain, corn and the like or fertilizers such as potash are commonly contained within large containers and transported in bulk by rail and truck. As associated with most granular forms of material, there is tendency for the material to shift and compact tightly within the confines of the container during transit. The extent of material compactness can depend on several factors, such as time in transit, weather, humidity levels, influential forces from bumps and jarring encountered during transit, and so forth. In most common scenarios, at the time for dispensing the transported material from the container, generally through an operable chute incorporated as part of the container's structure, one will often observe occurrences of bridging at and around the opening of the chute and adherence of residual material at and along crevices formed by adjoining walls, incline surfaces and like structural features within the container. As a result of this unfortunate occurrence, one must apply a sufficient force to the adhering material to effect complete removal from the container so that one may deliver a full load of material and/or prevent cross contamination with differing or incompatible types of material subsequently necessitating transport. Although recognizable advancements have been made in the art to effect localized flow of certain materials within the container for dispensing through the chute, they are generally ineffectual for systemic removal of adhering materials from within the container and, in some instance, can further structural damage to the container if care is not properly taken.

One such approach taken in the art involves the use vibration technology, particularly in the form of a motorized vibrating plate that temporally mounts to an outer sidewall of the container, and that upon power activation, purposefully effects to vibrate the sidewall at a predetermined frequency, presumably at a level sufficiently capable to commence movement of the material within the container while inhibiting deleterious impact to the structural integrity of the container. Although effective for this limited purpose, some materials may still reside with the container and even more problematic, may require repeated mounting of the motorized vibrating plate from location to location within the container to advance complete removal of the residual material, albeit to a varying degree.

In a more elaborate approach for removing materials, a pneumatic-based system may be employed at the point of unloading materials from containers, whereby a moveable arm equipped with a hose and nozzle assembly may supply air at a moderate force that is guided toward and directed to problematic areas, some of which being automated by means of computer control. Although effective for their intended applications, the more elaborate type of systems tends to be localized or stationary at the unloading station, complex, and costly to manage and operate over the long term.

While these approaches fulfill their respective, particular objectives and requirements, they fail to fulfill disclosure of a new compressed air cleaning system for systemic removal of particles generally carried and transported in large containers.

SUMMARY OF THE INVENTION

The general purpose of the present invention, which will be described subsequently in greater detail, is to provide a new compressed air cleaning system that effects efficient removal of particles carried and transported in large containers, which is not anticipated, rendered obvious, suggested, or even implied by any of the prior art, either alone or in any combination thereof. The present invention includes a container having an upper portion and a lower chute portion for dispensing particles therethrough; a refillable compressed air tank adaptably connecting to an air compressor; and an air hose assembly in communication with the air tank and the container.

There has thus been outlined, rather broadly, the more important features of the compressed air cleaning system for particles carried in large containers in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new compressed air cleaning system for systemic removal of particles carried and transported in large containers such to eliminate cross contamination of varying types of particles necessitating transport.

Still another object of the present invention is to provide a new compressed air cleaning system that eliminates the need to access an interior portion of a container such to fulfill safety to those whom are involved in dispensing particles from the container.

Still yet another object of the present invention is to provide a new compressed air cleaning system that effects efficient clean out of large containers, such as those that are categorically transported by truck and rail.

Even still another object of the present invention is to provide a new compressed air cleaning system that mitigates occurrences of serious injury to user operators by eliminating the need to gain access to an interior portion of a container to effect removal of residual, adhering particles from the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
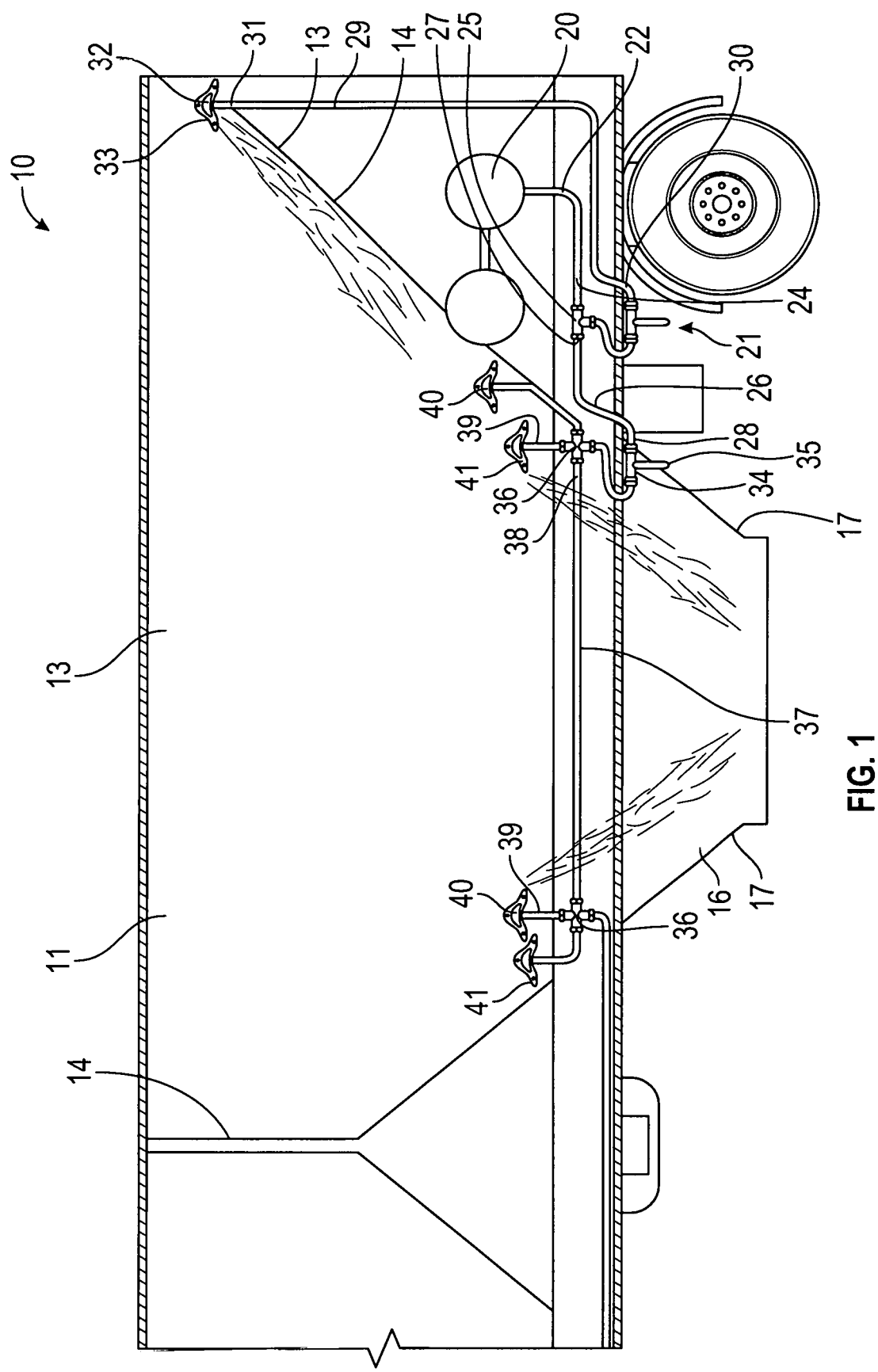
FIG. 1 is a side cross-sectional view of a compressed air cleaning system illustrating an air tank, a container having an upper portion and a lower chute portion, an air hose assembly mounted within the container and having an upper hose, an interconnecting hose, and a pump hose collectively connecting to a three-way pipe fitting.
Figure 2:
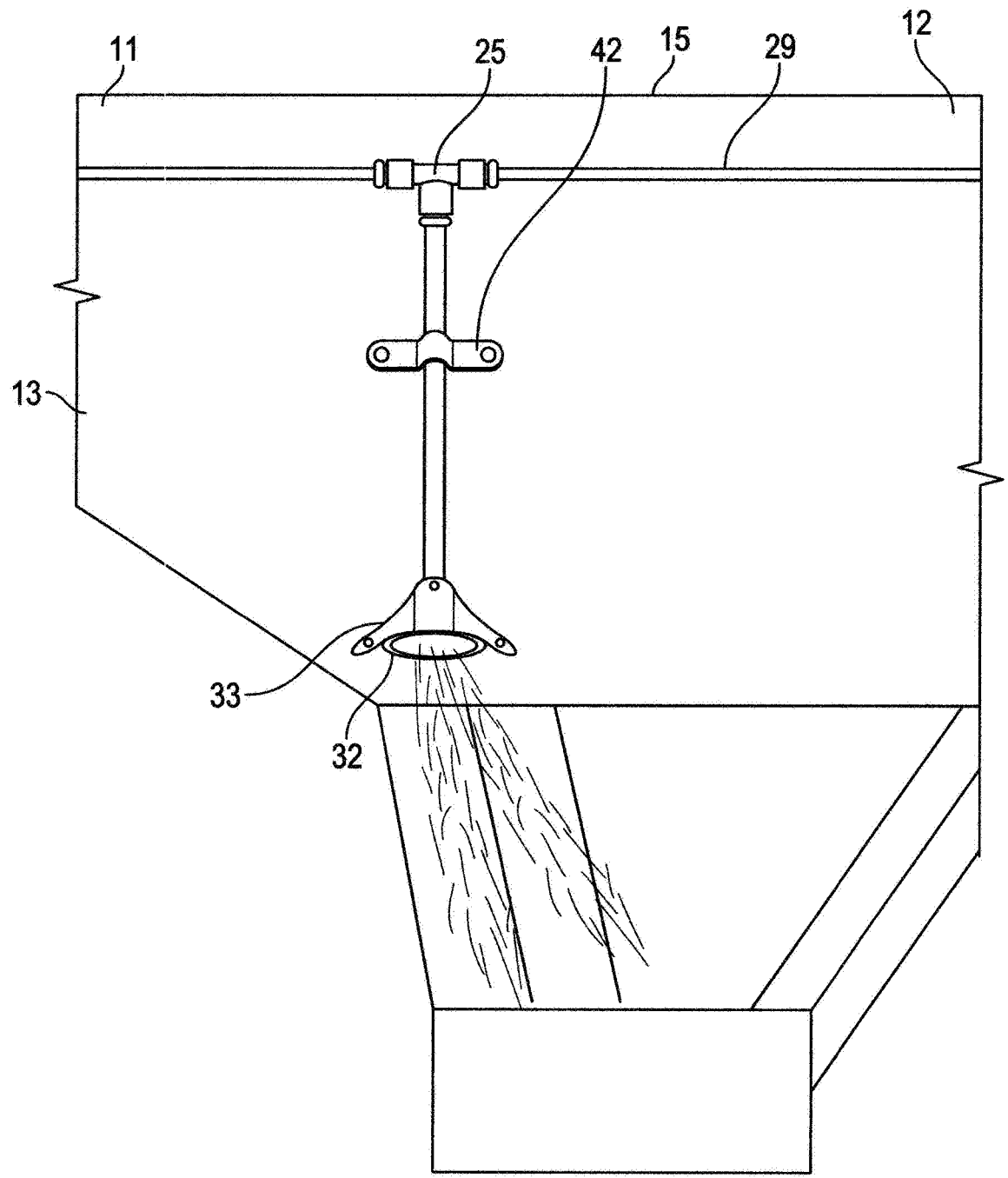
FIG. 2 is a top plan view of the present invention illustrating an upper hose traversing an upper portion of a container and having a protective cover fitted over a nozzle.
Figure 3:
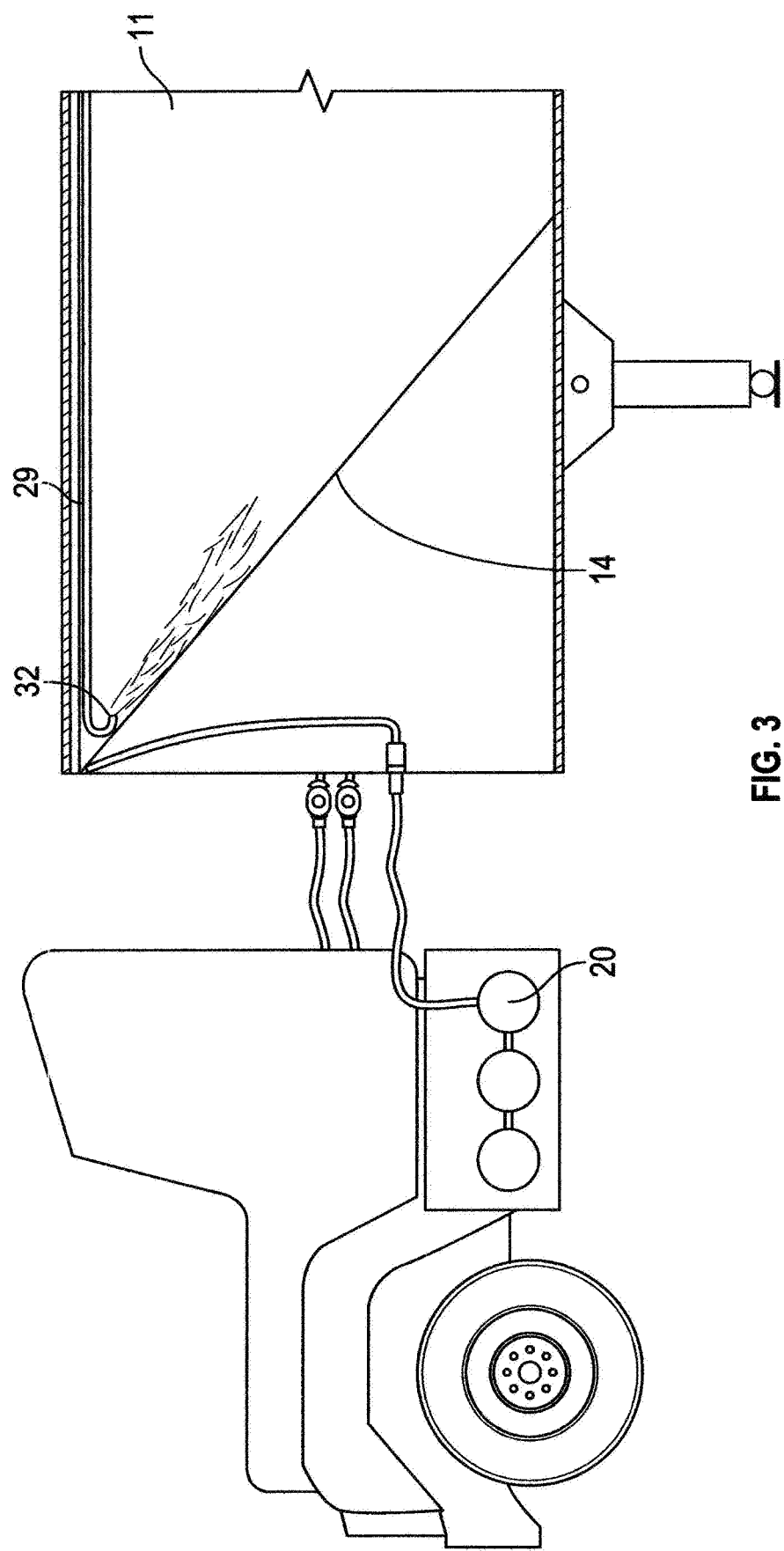
FIG. 3 is another side cross-sectional view of the present invention illustrating a tank, a container having an upper crevice, and an upper hose traversing along an upper portion of the container.
Figure 4:
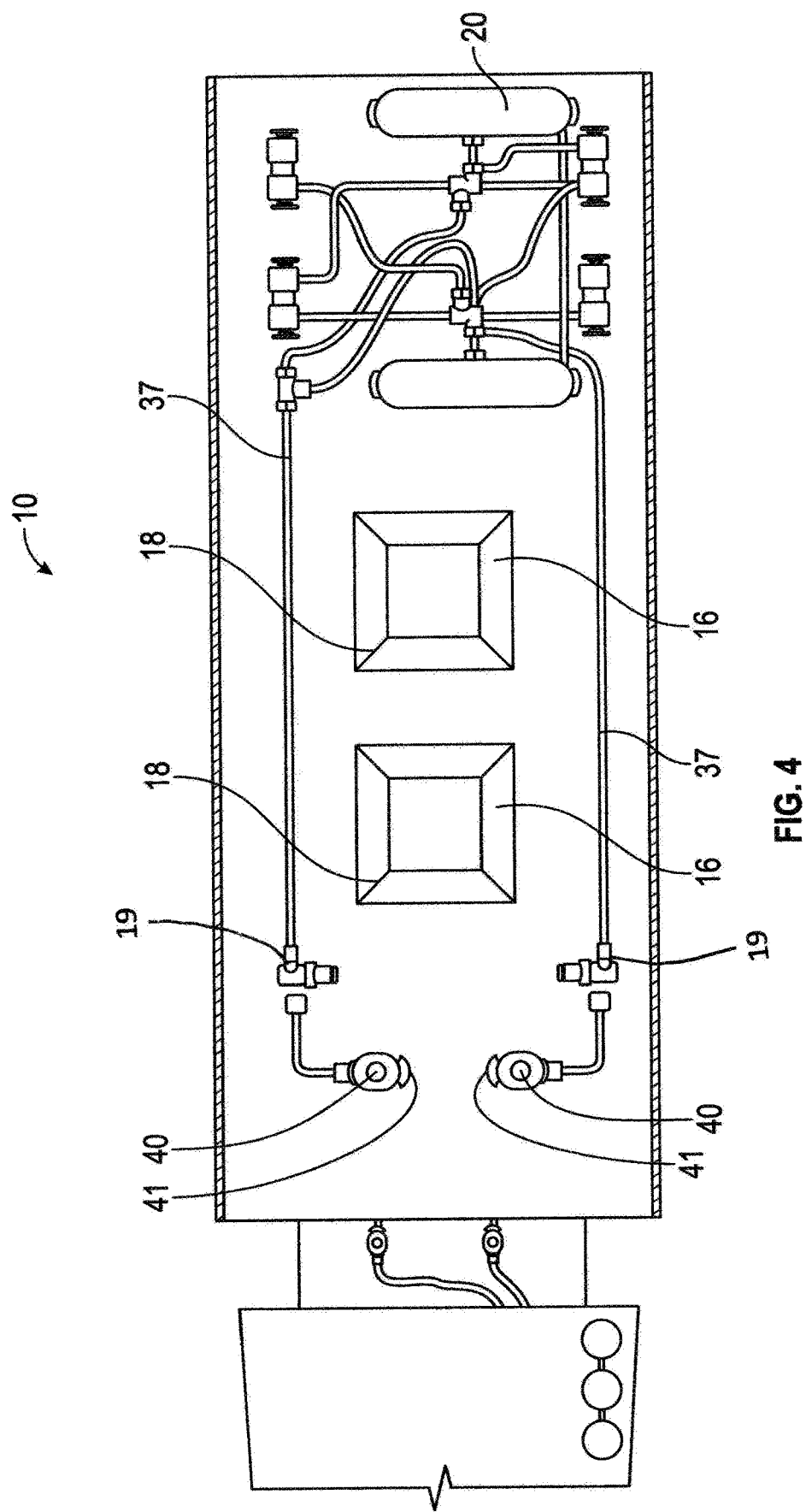
FIG. 4 is a top cross-sectional plan view of the present invention illustrating a container and chute hoses traversing along lower side walls of a lower chute portion of the container.

With reference now FIGS. 1-4, a new compressed air cleaning system embodying the principles and concepts of the present invention and generally designated by the reference numeral 10 will be described hereinafter.

As best illustrated in FIGS. 1 through 4, the compressed air cleaning system for particles carried in large containers 10 generally comprises a container 11 having an upper portion 12 and a lower chute portion 16 for carrying and dispensing particles; a refillable compressed air tank 20 adapted to be connected to an air compressor; and an air hose assembly 21 in communication with the air tank 20 and also with the container 11.

The upper portion 12 has upper side walls 13 which form upper crevices 14 at junctions of the upper side walls 13. The lower chute portion 16 has lower side walls 17 which form lower crevices 18 at junctions of the lower side walls 17 and also have holes 19 disposed therethrough.

The air hose assembly 21 includes a pump hose 22 conventionally connected to the air tank 20 and also includes a three-way pipe fitting 25 conventionally connected to a distal end 24 of the pump hose 22 and further includes an interconnecting hose 26 having a proximate end 27 conventionally connected to the three-way pipe fitting 25 and also an upper hose 29 having a proximate end 29 conventionally connected to the three-way pipe fitting 25. The air hose assembly 21 also includes valve members 34 each having a lever 35 and each being disposed inline of a respective interconnecting hose 26 and upper hose 29 for turning on and off the air from the air tank 20. The upper hose 29 traverses along a top edge 15 of the upper portion 12 of the container 11 and comprises a distal end 31 fitted with a nozzle 32 and a protective cover 33 conventionally disposed over the nozzle and a proximate end 30 conventionally connecting to the three-way pipe fitting 25. The nozzle 32 is directed downwardly onto the upper crevices 14 to blow particles hung up in the upper crevices 14 out of the container 11. The air hose assembly 21 further includes chute hoses 37 disposed through the holes 19 of and into the chute portion 16 of the container 11. Each of the chute hoses 37 traverses upon the lower side walls 17 and are fastened to the lower side walls 17 with U-shaped brackets 42. The interconnecting hose 26 has a distal end 28 conventionally connected to a four-way pipe fitting 36 and the chute hoses 37 each have a proximate end 38 conventionally connected to the four-way pipe fitting 36. Each of the chute hoses 37 has a distal end 39 with a nozzle member 40 and with a protective shroud 41 conventionally disposed over the nozzle member 40 to prevent the particles carried in the container 11 from entering the chute hoses 37. The nozzle members 40 of the chute hoses 37 are conventionally disposed above and directed downwardly upon the lower crevices 18 to blow the particles hung up in the lower crevices 18 out of the container 11 through the lower chute portion 16.

In use, the upper hose 29 is conventionally secured along the top edge 15 of the container 11 with the upper hose 29 directed downwardly in the container 11. The chute hoses 37 are conventionally secured inside the container 11 along the lower chute portion 16 with the chute hoses 37 directed downwardly in the container 11. Compressed air from the air tank 20 is conventionally released and air is blown through the hoses 22, 26, 29, 37 into the container 11 to blow hung-up particles out of the container 11. The upper hose 29 and the chute hoses 37 are directed downwardly onto the crevices 14, 18 formed inside the container 11 to blow the particles hung up in the crevices 14, 18 out of the container 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the compressed air cleaning system for particles carried in large containers. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A compressed air cleaning system for removing particles carried in large containers, said compressed air cleaning system comprising, in combination:
   a container having an upper portion and a lower chute portion for dispensing particles therethrough, said upper portion having upper side walls forming upper crevices at junctions of said upper side walls, said lower chute portion having lower side walls forming lower crevices at junctions of said lower side walls;
   a refillable compressed air tank adaptably connecting to an air compressor; and an air hose assembly in communication with said air tank and said container.

2. The compressed air cleaning system as set forth in claim 1, wherein said air hose assembly comprises a pump hose connecting said air tank to a three-way pipe fitting, an interconnecting hose having a proximate end connecting to said three-way pipe fitting, and an upper hose having a proximate end connecting to said three-way pipe fitting.

3. The compressed air cleaning system as set forth in claim 2, wherein said air hose assembly comprises valve members each being respectively disposed inline of said interconnecting hose and said upper hose for managing air flow from said air tank through said air hose assembly.

4. The compressed air cleaning system as set forth in claim 3, wherein said upper hose traverses along said upper portion of the container and comprises a distal end fitted with a nozzle.

5. The compressed air cleaning system as set forth in claim 4, wherein said nozzle of the upper hose is directionally orientated downward toward the upper crevices of the upper portion to effect removal of particles therefrom.

6. The compressed air cleaning system as set forth in claim 5, wherein said distal end of the upper hose comprises a protective cover disposed over said nozzle.

7. The compressed air cleaning system as set forth in claim 2, wherein said air hose assembly comprises chute hoses traversing said lower side walls of the lower chute portion.

8. The compressed air cleaning system as set forth in claim 7, wherein said interconnecting hose comprises a distal end connecting to a four-way pipe fitting, said chute hoses each having a proximate end connecting to said four-way pipe fitting.

9. The compressed air cleaning system as set forth in claim 7, wherein each of said chute hoses comprises a distal end fitted with a nozzle member.

10. The compressed air cleaning system as set forth in claim 9, wherein said nozzle members of the chute hoses are disposed above and directionally orientated downward toward the lower crevices of the lower chute portion to removal of particles therefrom.

11. The compressed air cleaning system as set forth in claim 10, wherein said distal end of the chute hose comprises a protective shroud disposed over said nozzle member.

12. A compressed air cleaning system for removing particles carried in large containers, said compressed air cleaning system comprising, in combination:
a container having an upper portion and a lower chute portion for dispensing particles therethrough, said upper portion having upper side walls forming upper crevices at junctions of said upper side walls, said lower chute portion having lower side walls forming lower crevices at junctions of said lower side walls;
a refillable compressed air tank adaptably connecting to an air compressor; and
an air hose assembly in communication with said air tank and said container, said air hose assembly having a pump hose connecting said air tank to a three-way pipe fitting, an interconnecting hose having a proximate end connecting to said three-way pipe fitting, and an upper hose having a proximate end connecting to said three-way pipe fitting.

13. The compressed air cleaning system as set forth in claim 12, wherein said upper hose traverses along said upper portion of the container and comprises a distal end fitted with a nozzle.

14. The compressed air cleaning system as set forth in claim 13, wherein said nozzle of the upper hose is directionally orientated downward toward the upper crevices of the upper portion to effect removal of particles therefrom.

15. The compressed air cleaning system as set forth in claim 12, wherein said air hose assembly comprises chute hoses traversing said lower side walls of the lower chute portion, each of said chute hoses having a distal end fitted with a nozzle member.

16. The compressed air cleaning system as set forth in claim 15, wherein said nozzle members of the chute hoses are disposed above and directionally orientated downward toward the lower crevices of the lower chute portion to effect removal of particles therefrom.

17. The compressed air cleaning system as set forth in claim 15, wherein said interconnecting hose comprises a distal end connecting to a four-way pipe fitting, said chute hoses each having a proximate end connecting to said four-way pipe fitting.

18. A compressed air cleaning system for removing particles carried in large containers, said compressed air cleaning system comprising, in combination:
a container having an upper portion and a lower chute portion for dispensing particles therethrough, said upper portion having upper side walls forming upper crevices at junctions of said upper side walls, said lower chute portion having lower side walls forming lower crevices at junctions of said lower side walls;
a refillable compressed air tank adaptably connecting to an air compressor; and
an air hose assembly in communication with said air tank and said container, said air hose assembly having a pump hose connecting said air tank to a three-way pipe fitting, an interconnecting hose having a proximate end connecting to said three-way pipe fitting, and an upper hose having a proximate end connecting to said three-way pipe fitting, said upper hose being configured to traverse along said upper portion of the container and comprises a distal end fitted with a nozzle, said air hose assembly further comprises chute hoses traversing said lower side walls of the lower chute portion, each of said chute hoses having a distal end fitted with a nozzle member, said nozzle of the upper hose being directionally orientated downward toward the upper crevices of the upper portion to effect removal of particles therefrom, said nozzle members of the chute hoses being disposed above and directionally orientated downward toward the lower crevices of the lower chute portion to effect removal of particles therefrom.

19. The compressed air cleaning system as set forth in claim 18, wherein said chute hoses are fastened to said lower side walls of the lower chute portion by U-shaped brackets.

* * * * *